(12) United States Patent
Cross et al.

(10) Patent No.: US 6,546,959 B2
(45) Date of Patent: *Apr. 15, 2003

(54) MULTI-PORT SOLENOID VALVE AND ITS ASSEMBLY

(75) Inventors: David P. Cross, Atkinson, NH (US);
Andreas A. Weiss, Nashua, NH (US);
Andrew Farkas, Hudson, NH (US);
Robert Irwin, Nashua, NH (US)

(73) Assignee: Parker Hannifin Corp., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/124,257

(22) Filed: Apr. 17, 2002

(65) Prior Publication Data

US 2002/0117203 A1 Aug. 29, 2002

Related U.S. Application Data

(63) Continuation of application No. 09/564,529, filed on May 4, 2000, now Pat. No. 6,425,409.
(60) Provisional application No. 60/143,728, filed on Jul. 14, 1999.

(51) Int. Cl.[7] ............................................. F16K 11/044
(52) U.S. Cl. ................ 137/627.5; 137/15.18; 137/884; 251/129.15
(58) Field of Search .................. 137/15.18, 625.65, 137/627.5, 884; 251/129.15

(56) References Cited

U.S. PATENT DOCUMENTS

| | | | | |
|---|---|---|---|---|
| 2,886,063 A | * | 5/1959 | Ray | 137/625.27 |
| 3,459,404 A | * | 8/1969 | Wisniewski | 137/625.65 |
| 3,891,001 A | * | 6/1975 | Botnick | 137/549 |
| 4,753,416 A | * | 6/1988 | Inagaki et al. | 137/625.65 |
| 4,773,447 A | * | 9/1988 | Imanaka et al. | 137/627.5 |
| 4,896,700 A | * | 1/1990 | Stoll | 137/884 |
| 5,992,461 A | * | 11/1999 | Gilmore et al. | 137/625.65 |
| 6,425,409 B1 | * | 7/2002 | Cross et al. | 137/15.18 |

* cited by examiner

*Primary Examiner*—Michael Powell Buiz
*Assistant Examiner*—Ramesh Krishnamurthy
(74) *Attorney, Agent, or Firm*—Renner, Otto, Boisselle & Sklar, LLP

(57) ABSTRACT

A valve includes a bobbin/valve body, a solenoid and a plunger. The bobbin/valve body is formed in one piece, defines all of the valve's inlet/outlet ports and forms the entire support structure for the solenoid and the plunger. To assemble the valve, a plunger body is inserted into the bobbin/valve body through an end opening into a longitudinal bore and a spring positioned to bias the plunger body to a normally closed position. A pole piece is then inserted through the end opening into the longitudinal bore and attached to the bobbin/valve body. A solenoid coil is wound around a central cylindrical section of the bobbin/valve body, and terminal pins and a flux conductor are attached to the bobbin/valve body. The attachment of the pole piece, the terminal pins, and/or the flux conductor may be accomplished by press-fit and/or swage coupling techniques.

16 Claims, 11 Drawing Sheets

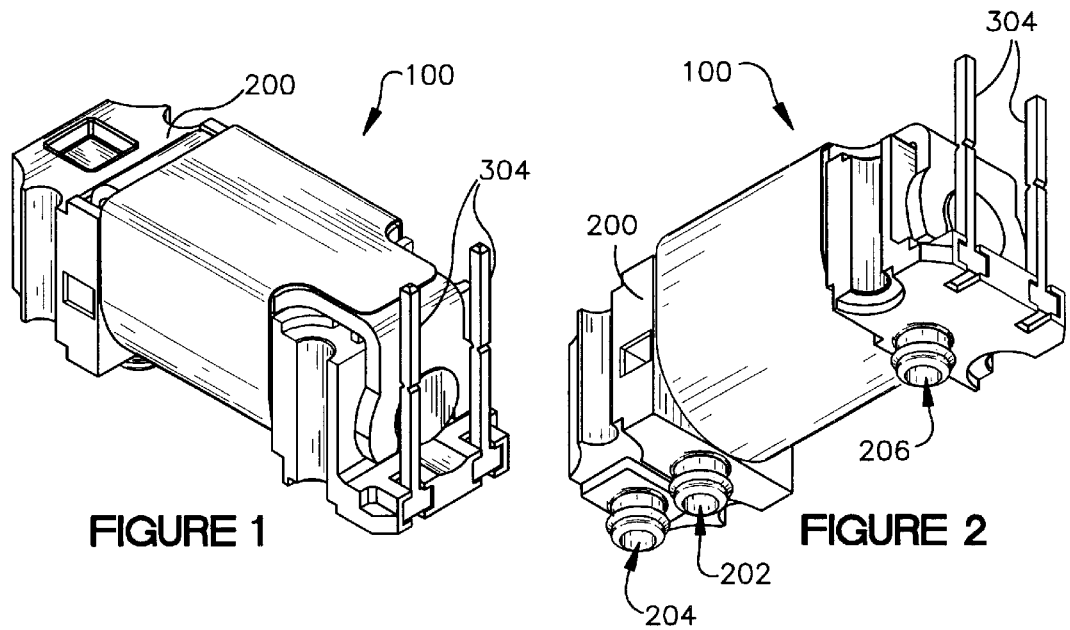
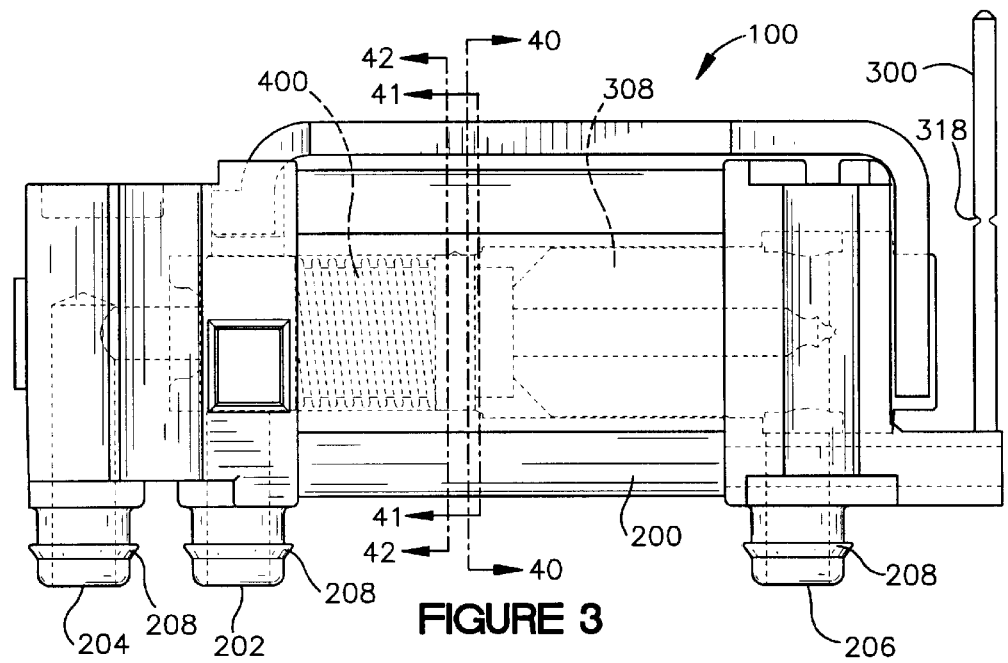

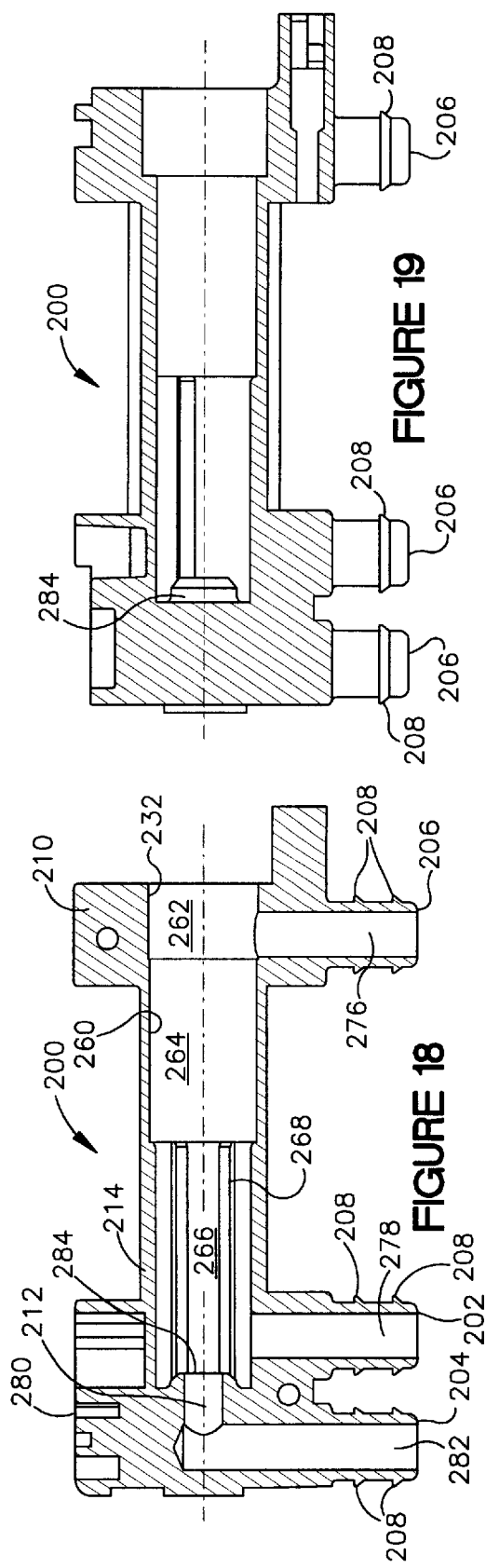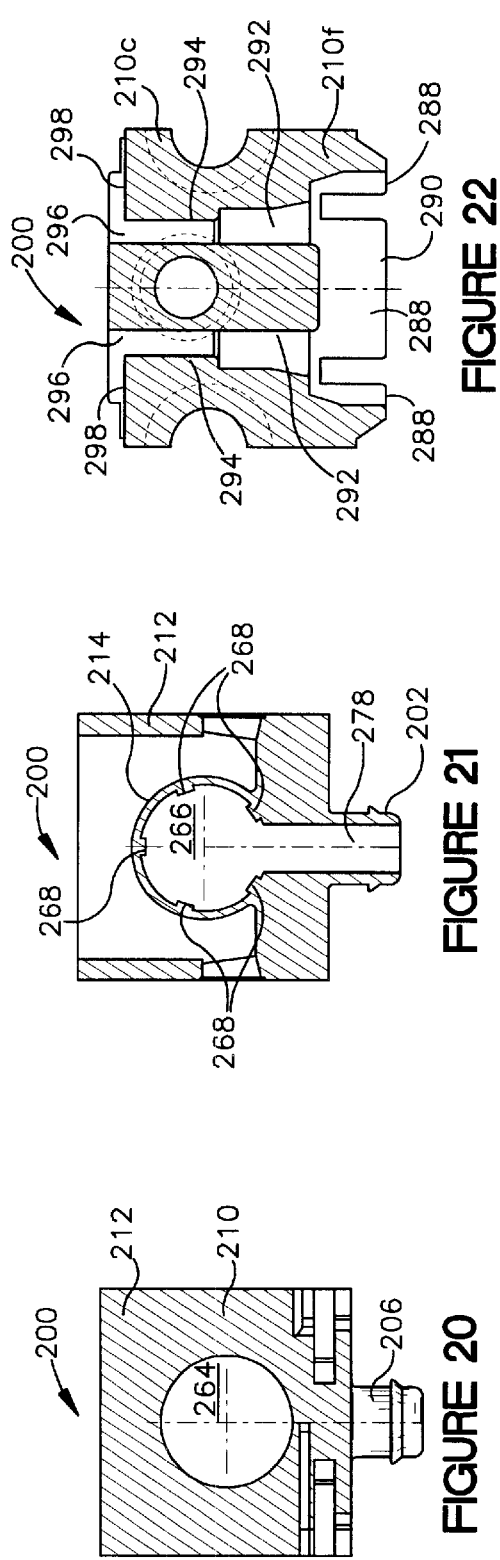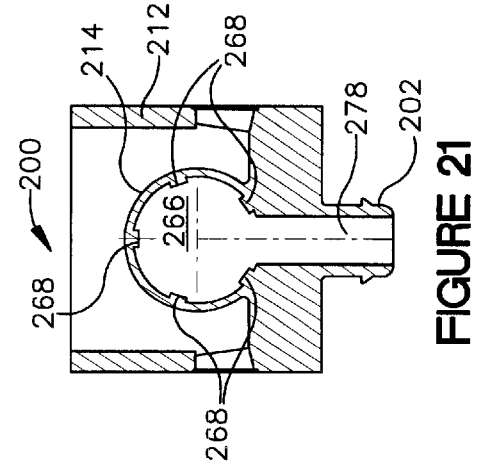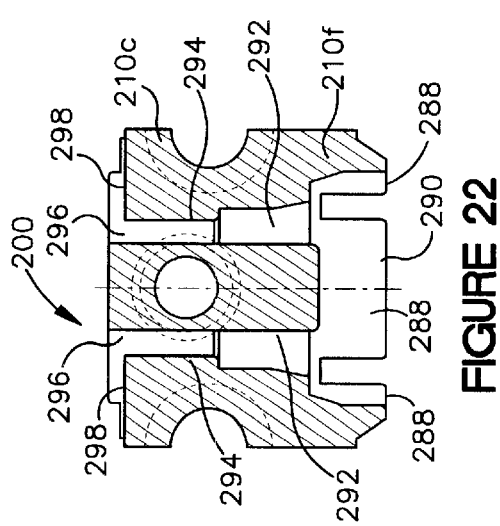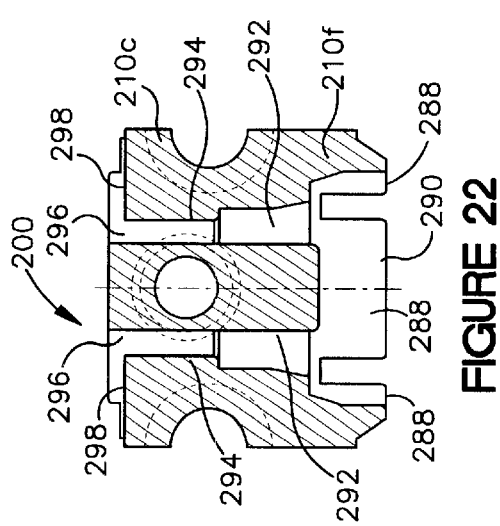

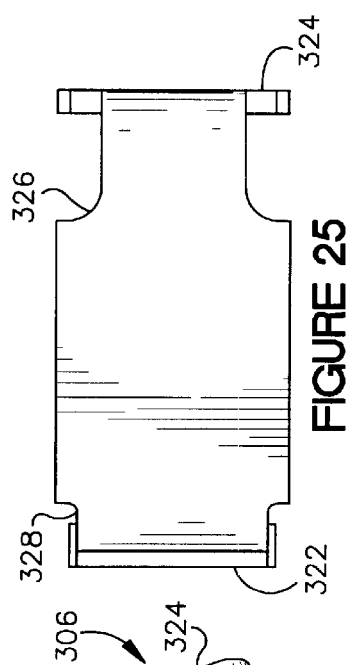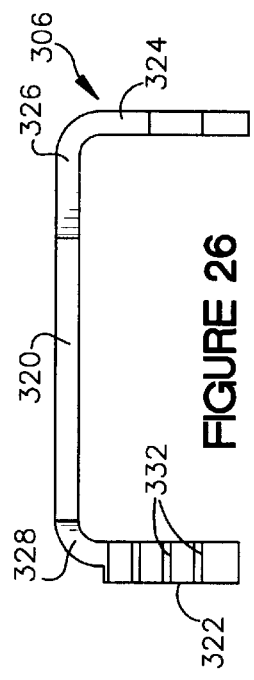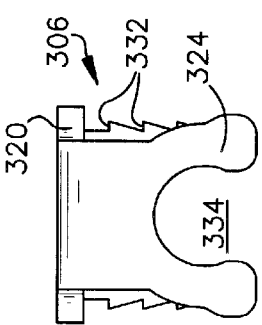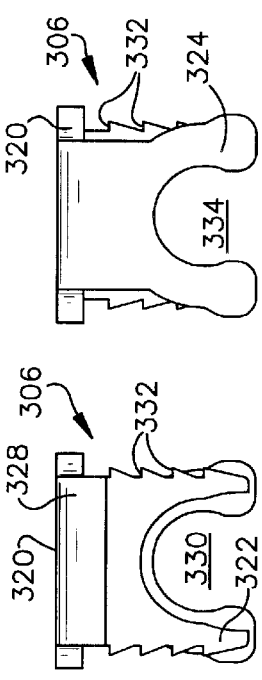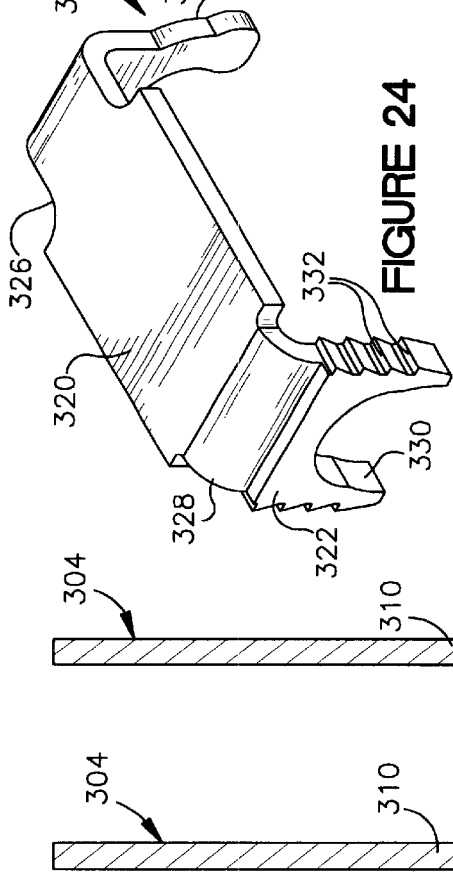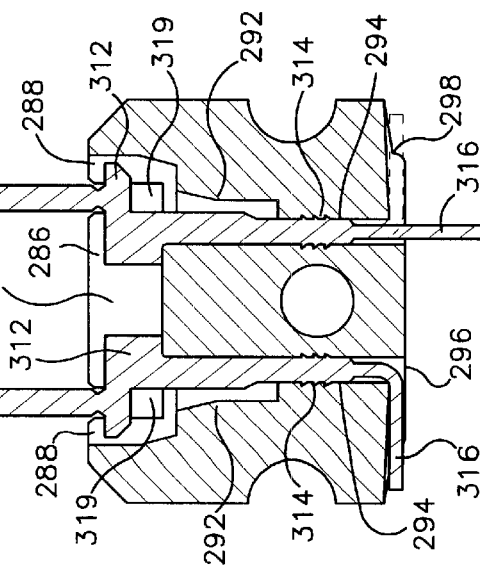

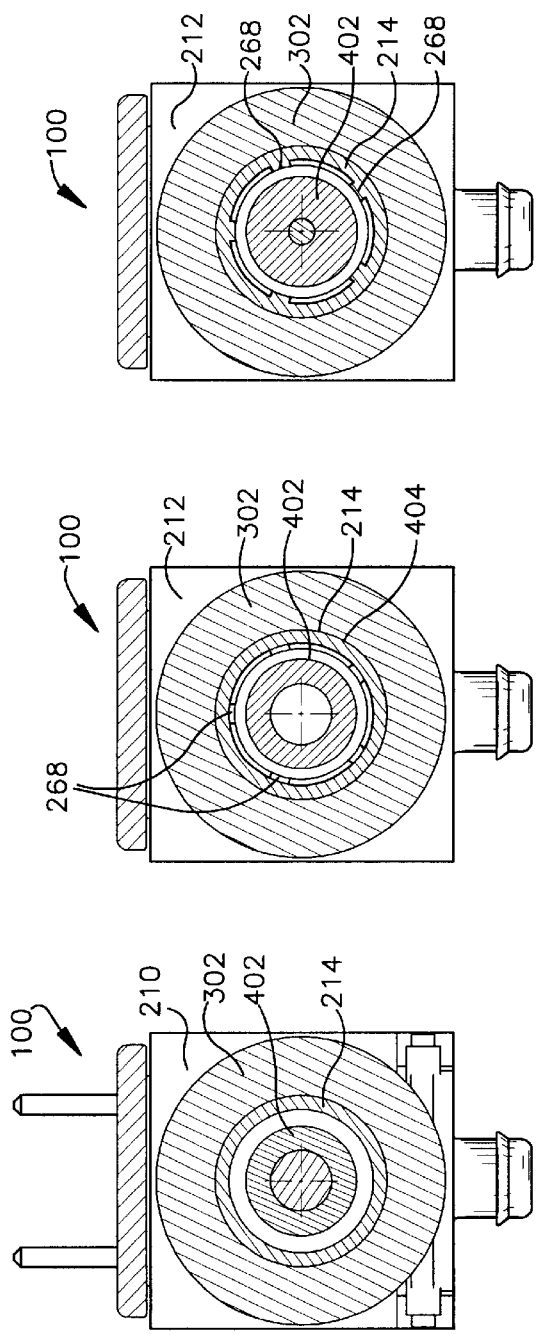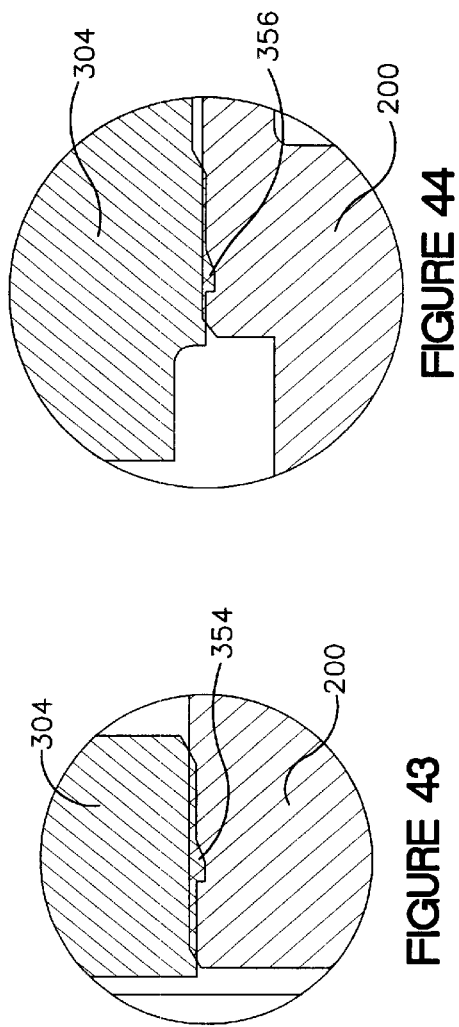

MULTI-PORT SOLENOID VALVE AND ITS ASSEMBLY

RELATED APPLICATIONS

This application claims priority under 35 U.S.C. §120 to U.S. patent application No. 09/564,529 May 4, 2000 now U.S. Pat. No. 6,425,409 which claims priority under 35 U.S.C. §119(e) to U.S. Provisional Application No 90/143, 728 filed Jul. 14, 1999. The entire disclosures of these earlier applications are hereby incorporated by reference.

FIELD OF THE INVENTION

This invention relates generally as indicated to a valve and method of making such a valve and more particularly to a three-way valve in which a unitary bobbin/valve body provides the entire support structure for the solenoid and the plunger and defines all of the valve's inlet/outlet ports.

BACKGROUND OF THE INVENTION

A valve typically includes a plurality of ports through which fluid is selectively passed to accomplish a desired flow path. For example, a three-way valve may include a common port, a normally open port, and a normally closed port. When the valve is in an inactivated state, fluid enters the valve through the common port and exits through the normally open port. When the valve is in an activated state, fluid enters the valve through the common port and exits through the normally closed port.

A three-way valve may include a solenoid and a plunger that is used to shift the valve between its inactivated and activated states. Such a solenoid comprises components which generate and transmit a magnetic field. Specifically, a solenoid may include a solenoid coil which generates a magnetic field upon application of an electrical current and this magnetic field is transmitted to a pole piece. Terminal pins are typically provided to selectively energize the solenoid coil and a flux conductor is typically provided to concentrate magnetic flux in a desired manner.

A plunger commonly comprises a plunger body or armature which directs the flow through the valve in response to the energization/deenergization of the solenoid. A spring or other type of biasing assembly is typically provided to bias the plunger body towards a position whereat it seals off the passageway to the normally closed port and not the normally open port. When the solenoid is energized, the plunger body is pulled towards the pole piece by the magnetic force (that overcomes the spring biasing force) to a position whereat it seals off the passageway to the normally open port and not the normally closed port.

A three-way solenoid valve commonly includes a bobbin and one or more valve body pieces which together define the ports and which together provide a support structure for the solenoid and the plunger. The coupling of the bobbin and the valve body piece(s) together requires separate assembly steps and/or special coupling components. Moreover, the unions between the bobbin and the valve body piece(s) introduce leakage issues sometimes requiring separate inspection tests during assembly of the valve.

Three-way valves are used for a wide variety of industrial, medical, and other types of analytical systems. Different types of valve mounting arrangements are often required depending on the particular system. For example, some applications require a manifold mounted arrangement and other applications require a printed circuit board arrangement. Furthermore, different orientations of the valve ports are often required in different plumbing settings. Additionally or alternatively, it is often necessary (or at least desired) to have a two dimensional array of valves mounted on the same manifold and/or printed circuit board.

In many valve applications, dimensions are crucial and constant efforts are being made to reduce the size of valve assemblies. However, while size reduction is desirable, it often comes at the expense of more complicated assembly techniques and/or elevated manufacturing costs. Furthermore, the smallness of the bobbin and/or the valve body piece(s) tends to increase leakage issues during assembly due to, among other things, the tight tolerances involved. Additionally or alternatively, size reduction often results in the sacrifice of some desirable features, such as adjustability of valve seat sealing characteristics and/or electrical terminal options. Moreover, valve size reduction is sometimes difficult to accomplish within reasonable economic ranges and thus such reduction is of little benefit in many cost-sensitive valving situations.

Accordingly, the inventors appreciated that a need remains for compact and versatile valves that may be made by simplified assembly techniques and within reasonable economic ranges, without significant leakage issues.

SUMMARY OF INVENTION

The present invention provides a valve that may be manufactured and assembled in a relatively simplified and economic manner. Additionally, the valve's design is such that leakage issues are minimized and the valve may be used for a wide variety of industrial, medical and/or analytical systems without requiring different valve constructions. Further, a preferred form of the valve allows for adjustment of valve seat sealing characteristics (by changing the biasing force on the spring) and/or is compatible with different orientations of terminal pins. The valve may be produced in a very compact size thereby making it suitable for applications requiring small scale valving apparatus. However, the valve design of the present invention has many features equally advantageous in larger scale valving apparatus and thus the valve could be made in wide variety of dimensions.

More particularly, the present invention provides a valve comprising a bobbin/valve body, a solenoid, and a plunger. The bobbin/valve body is formed in one piece and defines a common port, a normally closed port, a normally open port, a longitudinal bore, and respective passageways between the longitudinal bore and the ports. The bobbin/valve body provides the entire support structure for the solenoid and the plunger whereby assembly and inspection steps associated with joining together separate bobbin and valve body piece (s) are eliminated. For this same reason, leakage issues may be significantly reduced. Additionally, the preferred bobbin/ valve body may be made by economic mass manufacturing methods thereby further reducing manufacturing costs. Furthermore, a valve construction wherein a one-piece bobbin/valve body defines at least the normally open port (and not necessarily the common port or the normally closed port) is believed to in and of itself reduce the size of the valve.

The bobbin/valve body preferably comprises an end portion defining the normally open port, another end portion defining the common and normally closed ports, and a cylindrical central portion therebetween. The common port, the normally closed port, and the normally open port are preferably aligned with each other in the axial direction of the longitudinal bore thereby making the valve compatible with a variety of different mounting arrangements. For example, the valve is especially suitable for manifold mounting and to this end barbs are preferably provided on the port nipples to allow with-seal or without-seal coupling to the manifold channels. The valve is also especially suitable for mounting on a printed circuit board and to this end the exterior walls of the bobbin/valve body preferably include slots, grooves, and/or recesses to accommodate appropriate mounting elements (e.g., mounting wires, screws, clips, etc.).

The plunger includes a plunger body which moves within the longitudinal bore of the bobbin/valve body in response to the energization/deenergization of the solenoid. Specifically, the plunger body moves between a first position whereat the passageway to the normally closed port is sealed and the passageway to the normally open port is open and a second position whereat the passageway to the normally closed port is open and the passageway to the normally open port is sealed. In this manner, fluid flows through the common port to the normally open port when the plunger body is in the first position and through the common port to the normally closed port when the plunger body is in the second position. Preferably, the plunger body is moved to the second position upon energization of the solenoid.

The solenoid preferably includes a pole piece positioned within the longitudinal bore and the pole piece preferably defines a passageway from the bobbin/valve body's passageway to the normally open port. This passageway extends through an opening in an axial end of the pole piece and a valve seat surrounds this opening. Another valve seat (defined by the bobbin/valve body) surrounds the passageway from the longitudinal bore to the normally closed port. The plunger body seals the body's valve seat when in one of its first and second positions and seals the pole's valve seat when in the other position. Preferably, the plunger body seals the body's valve seat when in its first position (when the solenoid is deenergized) and seals the pole's valve seat when in its second position (when the solenoid is energized).

The plunger body and/or the bobbin/valve body preferably includes longitudinal ribs that extend radially to define flow channels between the plunger body and the bobbin/valve body. Preferably, the longitudinal bore of the bobbin/valve body includes a ribbed section including the ribs and the passageway between the longitudinal bore and the common port communicates with this ribbed section. The pole's passageway preferably includes a longitudinal passageway and a radial passageway. The longitudinal passageway extends from the valve seat to the radial passageway and the radial passageway communicates with the bobbin/valve body's passageway to the normally open port. Flow introduced through the common port passes through the relevant passageway to the longitudinal bore and into the rib-defined flow channel towards the pole's valve seat. When the solenoid is deenergized (or unenergized), and the plunger body is in its first position, the pole's valve seat is open and the fluid flows through the pole's longitudinal and radial passageways to the normally open port.

The passageway between the longitudinal bore and the normally closed port includes a cross-over passageway extending axially outward from the body's valve seat and a passageway extending perpendicularly from the cross-over passageway to the normally closed port. When the solenoid is energized, and the plunger body is in its second position, the pole's valve seat is sealed and the body's valve seat is opened. Fluid thus passes from the longitudinal bore through the passageways to the normally closed port. Upon deenergization of the solenoid, the plunger body is moved back to the first position whereby fluid flows through the pole passageways to the normally open port.

The plunger preferably includes a spring that biases the plunger body towards the normally closed valve seat (in the bobbin/valve body) and a spring retainer that holds the spring in the desired biasing relationship. The spring is preferably a cylindrical spring that circumferentially surrounds the plunger body and the spring retainer is preferably a ring-shaped member secured radially inward of the flow channel-defining ribs. This arrangement of the spring relative to the plunger body allows a reduction in overall length of the valve when compared to, for example, a valve design wherein a spring is positioned axially in line with the plunger body. Also, this arrangement of the spring and spring retainer allows for adjustment of the valve seat sealing characteristics by adjusting the position of the spring retainer and thus the biasing force of the spring.

To assemble the valve according to the present invention, the bobbin/valve body is formed in one piece, preferably by an economic mass manufacturing process, such as injection molding. The plunger body is inserted through an end opening in the bobbin/valve body into the longitudinal bore. The spring is situated around the plunger body and the spring retainer is attached to the bobbin/valve body, preferably by press-fitting, to hold the spring in the desired biasing position. After insertion of the plunger components, the pole piece is inserted through the opening into the longitudinal bore and attached to the bobbin/valve body. A solenoid coil is wound around the central cylindrical section of the bobbin/valve body and the terminal pins are attached to the body in such a manner that they are in contact with the solenoid coil. A flux conductor (preferably of a one-piece construction) is then attached to the bobbin/valve body and the pole piece to complete the assembly of the valve. Preferably, the attachment of the spring retainer, the pole piece, terminal pins and/or the flux conductor is accomplished by a press-fit coupling arrangement. Thus, no additional coupling components, materials and/or steps (e.g., welds, adhesives, etc.) are required thereby simplifying assembly techniques and reducing manufacturing costs.

With particular reference to the terminal pins, the preferred attachment technique includes inserting sections of the pins through openings in the bobbin/valve body and placing end sections in contact with the solenoid coil. The "non-inserted" sections of the pins may be bent into the desired orientation. In this manner, different types of terminal pins may be incorporated into the valve and/or the same terminal pins may be trimmed or otherwise bent to accommodate different mounting arrangements.

It may be noted that one or more of the desired features of the invention may be combined to create a valve of a desired construction. For example, a bobbin/valve body (one piece or otherwise) having a flat exterior mounting surface (except for the port nipples) is believed to be advantageous in and of itself in view of its compatibility with different manifold/board mounting arrangements. A valve construction wherein the solenoid coil surrounds both the plunger body and the pole piece and/or a flux conductor which straddles an axial section of the bobbin/valve body including both the common port and the normally open port is beneficial in view of the potential for overall length-reduction of the valve. Furthermore, a valve incorporating the press-fit attachment of the terminal pins, and the ability to bend them to accommodate different mounting arrangements, provides advantages with or without the other preferred features of the invention.

Thus, the present invention provides a compact and versatile valve that may be made by simplified assembly techniques and within reasonable economic ranges, without significantly increasing leakage issues. These and other features of the invention are fully described and particularly pointed out in the claims. The following description and drawings set forth in detail a certain illustrative embodiment of the invention, these embodiments being indicative of but one of the various ways in which the principles of the invention may be employed.

DRAWINGS

FIG. 1 is a side and perspective view of a valve according to the present invention.

FIG. 2 is a bottom and perspective view of the valve.

FIG. 3 is side view of the valve with certain interior components being shown in phantom.

FIG. 18 is a sectional view of the bobbin/valve body as seen from line 18—18 in FIG. 17.

FIG. 19 is a sectional view of the bobbin/valve body as seen from line 19—19 in FIG. 17.

FIG. 20 is a sectional view of the bobbin/valve body as seen from line 20—20 in FIG. 14.

FIG. 21 is a sectional view of the bobbin/valve body as seen from line 21—21 in FIG. 14.

FIG. 22 is a sectional view of the bobbin/valve body as seen from line 22—22 in FIG. 16.

FIG. 23 is a view similar to FIG. 22 but with terminal pins partially assembled within the bobbin/valve body.

FIG. 24 is a side perspective view of a component of the valve's solenoid, namely a flux conductor.

FIG. 25 is a top view of the flux conductor.

FIG. 26 is a side view of the flux conductor.

FIG. 27 is an end view of the flux conductor.

FIG. 28 is an opposite end view of the flux conductor.

FIG. 40 is a radial cross-sectional view of the valve taken along line 40—40 in FIG. 3.

FIG. 41 is a radial cross-sectional view of the valve taken along line 41—41 in FIG. 3.

FIG. 42 is a radial cross-sectional view of the valve taken along line 42—42 in FIG. 3.

FIG. 43 is an enlarged portion of FIG. 39.

FIG. 44 is another enlarged portion FIG. 39.

DETAILED DESCRIPTION

Figure 4:
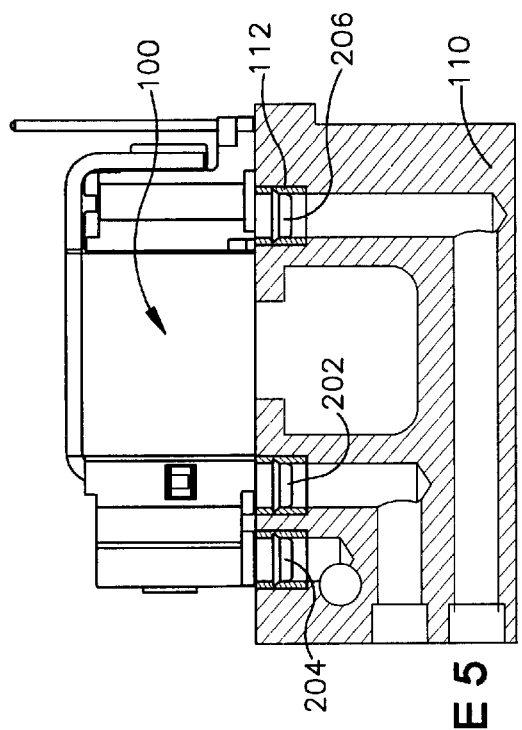
FIG. 4 is a side view, partially in section, showing the valve installed on a manifold.

Referring now to the drawings in detail, and initially to FIGS. 1–3, a valve 100 according to the present invention is shown. The valve 100 includes a bobbin/valve body 200, a solenoid 300 and a plunger 400. The bobbin/valve body 200 defines a common port 202, a normally closed port 204 and a normally open port 206. The valve components are configured so that when the solenoid 300 is deenergized, fluid enters the valve 100 through the common port 202 and exits through the normally open port 206. When the solenoid 300 is energized, fluid enters the valve 100 through the common port 202 and exits through the normally closed port 204.

The construction of the valve 100 is such that it may be produced in very a compact size within a reasonable economic range. For example, a prototype has been developed which has an approximately 22.86 mm length, a 7.87 mm width, an 8.92 mm height (without port nipples) and a 1.78 mm port nipple length and weighs in at less than 0.10 ounces. Significantly, this size reduction does not come at the expense of more complicated assembly techniques, increased leakage problems and/or the sacrifice of desirable features. In fact, as is explained in more detail below, the valve 100 may be manufactured and/or assembled in a relatively simplified manner and its construction is such that leakage issues are minimized. Also, the preferred form of the valve 100 allows for the selective adjustment of valve seat sealing characteristics and/or the accommodation of different types of electrical connections.

Figure 5:
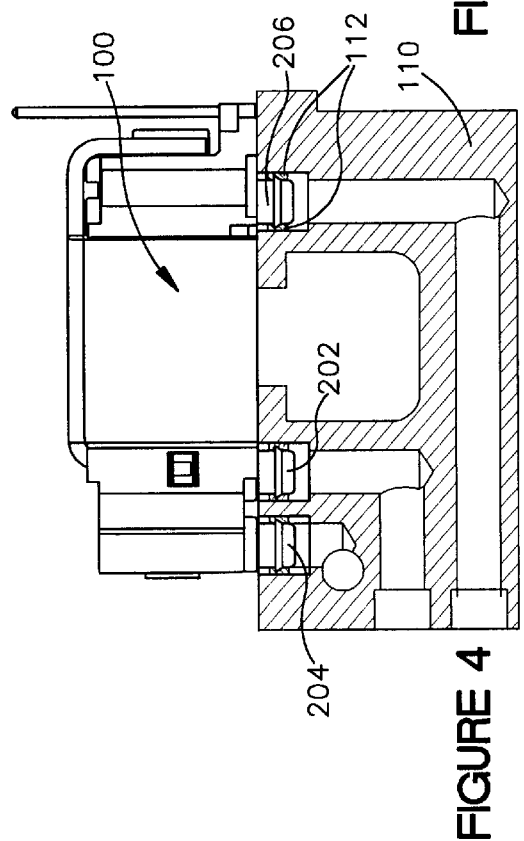
FIG. 5 is side view, partially in section, showing the valve installed on the manifold in another manner.
Figure 7:
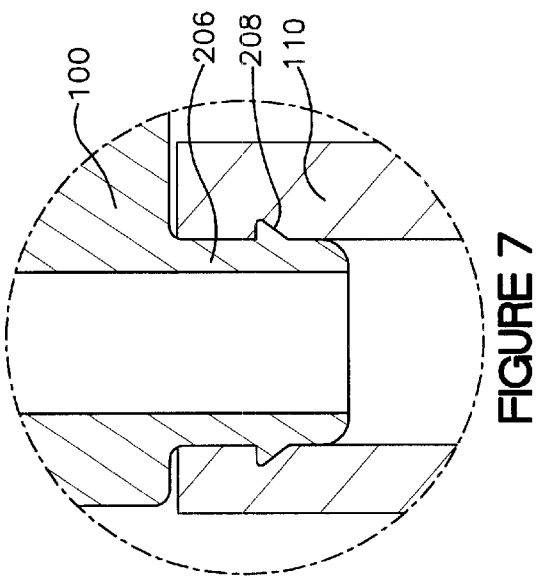
FIG. 7 is enlarged sectional view of a portion of FIG. 6.
Figure 6:
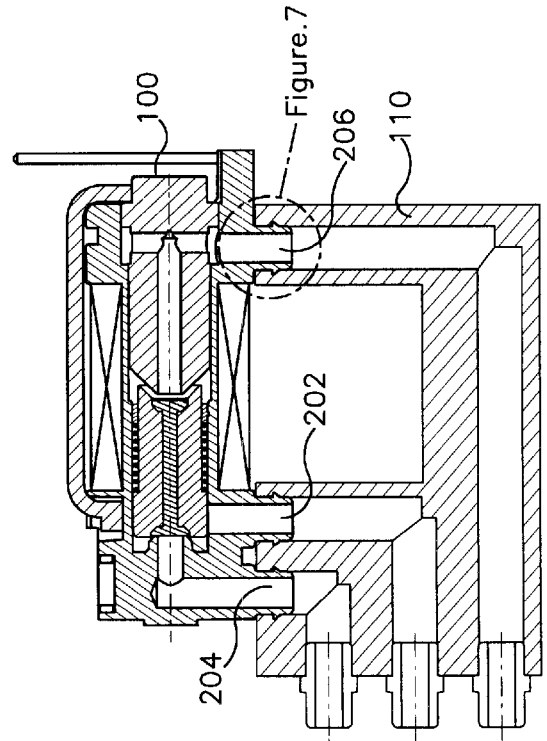
FIG. 6 is a side view, partially in section, showing the valve installed on another manifold.

Moreover, the valve 100 may be used for a wide variety of industrial, medical and analytical systems and does not require different valve constructions to accommodate these different mounting arrangements. As illustrated in FIGS. 4–6, the valve 100 is particularly suited for mounting on a manifold 110 because of the axial alignment of the ports 204, 206 and 208. Also, the ports 298 each include radial barbs 208 for use in sealing the valve 100 to the manifold. (FIG. 7.) Specifically, the barbs 208 make it possible to mount the valve 100 with nose seals 112 (FIG. 4), tube seals 114 (FIG. 5), or no seals (FIG. 6) with appropriate manifold material. An appropriate manifold material would be, for example, a compliant elastomeric material such as polyurethane.

Figure 8:
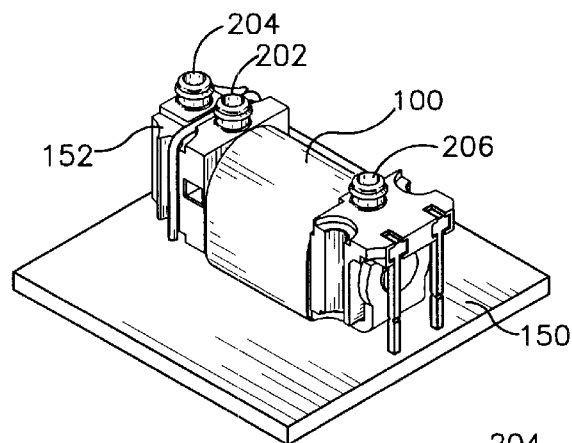
FIG. 8 is a perspective view of the valve installed on a printed circuit board in a ports-up orientation.
Figure 9:
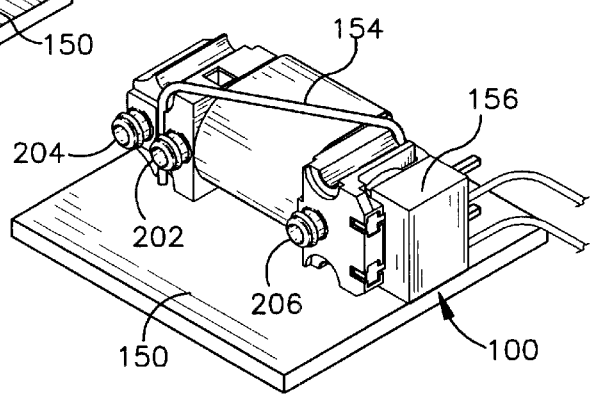
FIG. 9 is a perspective view of the valve installed on a printed circuit board or panel in a ports-to-the-side orientation.
Figure 10:
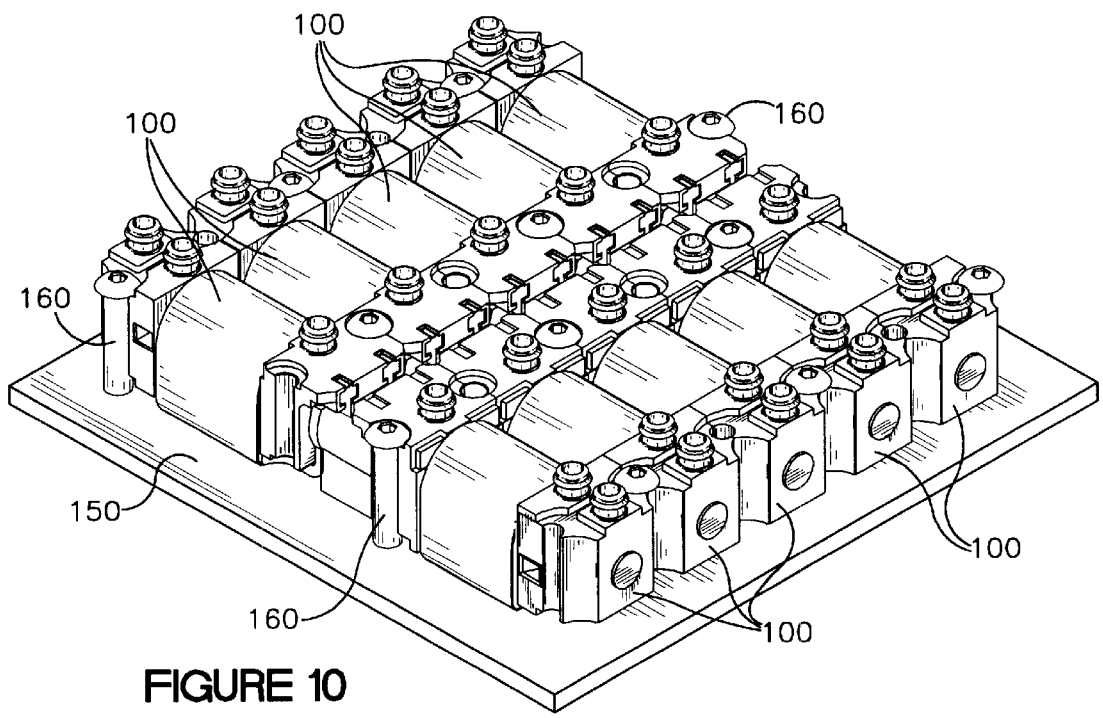
FIG. 10 is a perspective view of a plurality of valves according to the present invention installed in an array arrangement on a printed circuit board or panel in a ports-up orientation.
Figure 11:
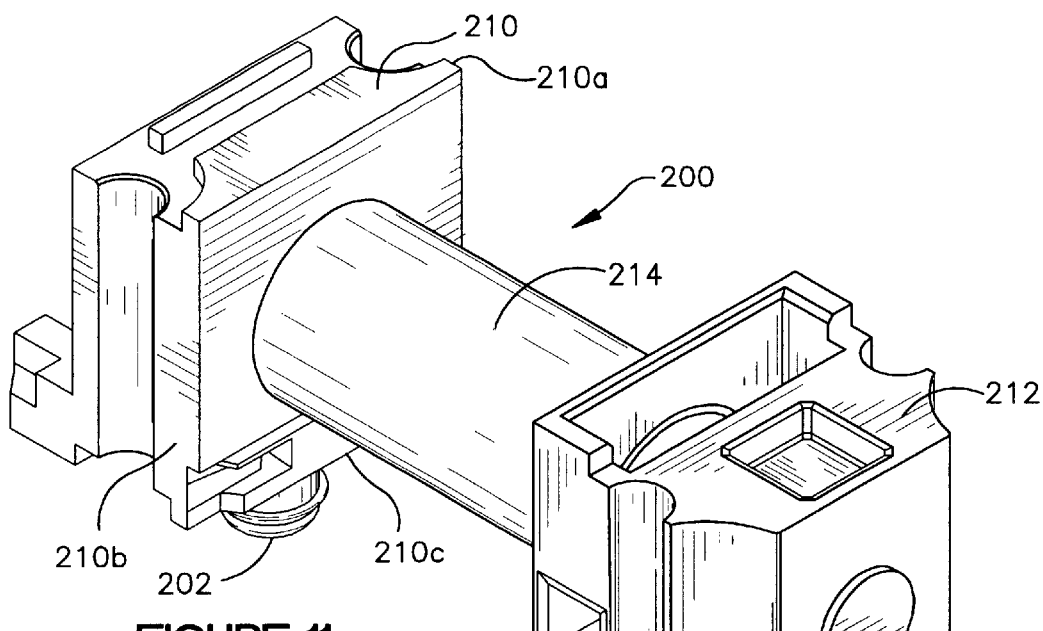
FIG. 11 is a side and perspective view of a bobbin/valve body of the valve.
Figure 12:
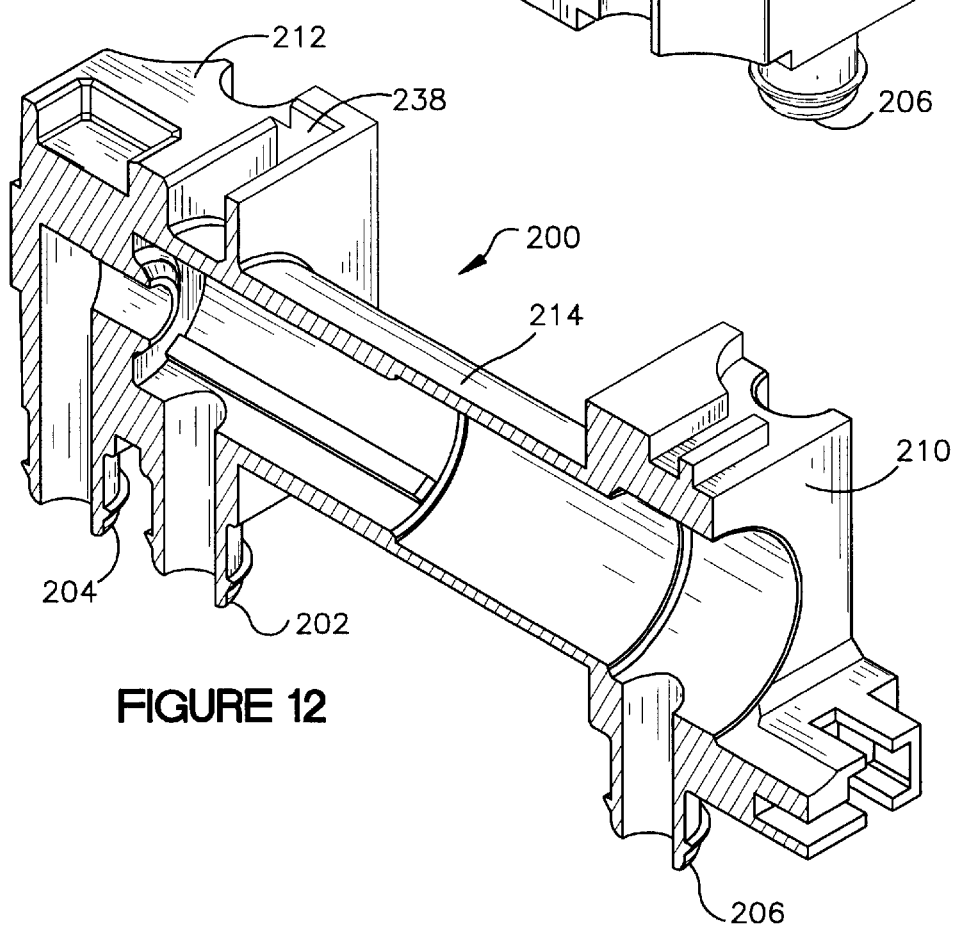
FIG. 12 is sectional perspective view of the bobbin/valve body.

As illustrated in FIGS. 8–10, the valve 100 is also particularly suited for mounting on a printed circuit board or panel 150. Particularly, the valve 100 may be mounted in a "ports-up" orientation as shown in FIG. 8 and secured in position relative to the board by a C-shaped mounting wire 152. Alternatively, the valve 100 may be mounted in a "ports-to-the-side" orientation as shown in FIG. 9 and secured in position by a cross-wire 154 with a termination connector 156. Additionally, a plurality of the valves 100 may be arranged in a two-dimensional array on the board 150 as shown in FIG. 10 and secured in position by screws 160.

Referring now to FIGS. 11–22, the bobbin/valve body 200 is shown isolated from the other components of the valve 100. The bobbin/valve body 200 is formed in one piece (preferably as a unitary molded part) and provides the entire support structure for the solenoid 300 and the plunger 400. Also, as was indicated above, the body 200 defines the common port 202, the normally closed port 204, and the normally open port 206. The one piece construction of the bobbin/valve body 200 eliminates the assembly and inspection steps associated with joining together separate bobbin and valve body piece(s). For this same reason, leakage issues may be significantly reduced when compared to, for example, a valve design including separate bobbin and valve body piece(s). The bobbin/valve body 200 may be made by economic mass manufacturing methods, such a injection molding, thereby further reducing manufacturing costs. The bobbin/valve body 200 includes an end block portion 210 defining the normally open port 206, an end block portion 212 defining the common and normally closed ports 202 and 204, and a central cylindrical portion 214 therebetween.

Figure 13:
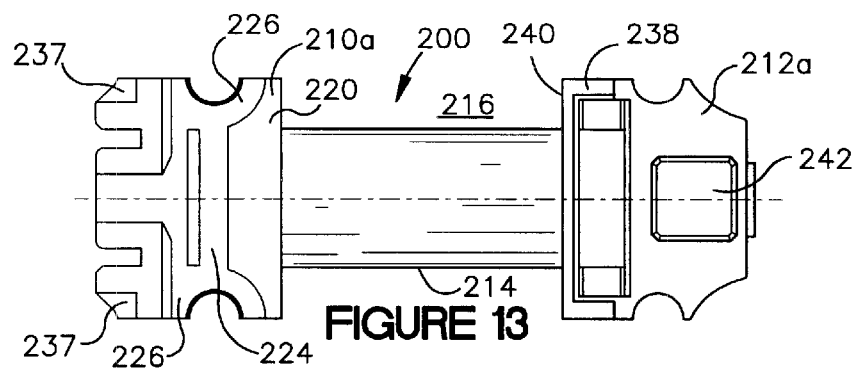
FIG. 13 is a top view of the bobbin/valve body.
Figure 14:
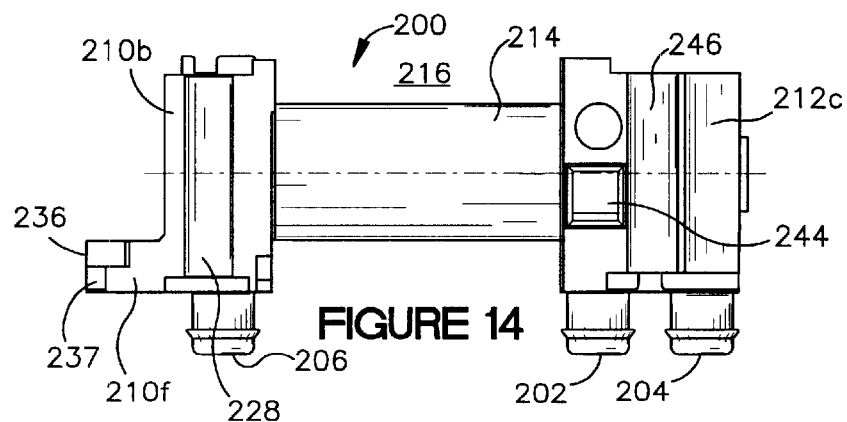
FIG. 14 is a side view of the bobbin/valve body.
Figure 15:
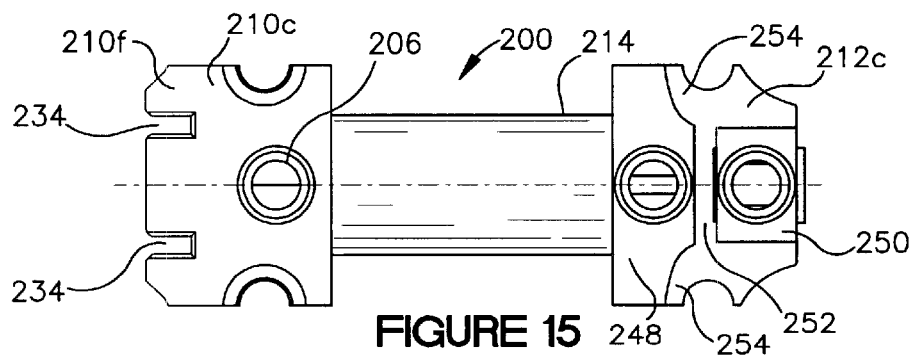
FIG. 15 is a bottom view of the bobbin/valve body.

The end portion 210 includes a top wall 210a, side walls 210b, a bottom wall 210c, and end walls 210d and 210e which together form a roughly rectangular prism shape. The normally open port nipple 206 extends perpendicularly outwardly from the bottom wall 210c (FIGS. 14–17) whereby the end block portion 210 may be referred to as the one-port end portion of the bobbin/valve body 200. The end portion 210 further includes a shelf 21 Of extending outwardly from its bottom wall 210c and perpendicularly from its end wall 210d. (FIGS. 13–17.) The end block portion 212 has a top wall 212a, a bottom wall 212c, side walls 212b, and end walls 212d and 212e (FIGS. 13–17) forming an essentially cubical shape except for its concavely curved outer corners (FIGS. 13 and 15). The central portion 214 extends centrally between the end walls 210e and 212e and includes an outer cylindrical wall 214a that defines, in conjunction with the end walls 210d and 212d, an annular cavity 216. (FIGS. 13–15.)

Figure 16:
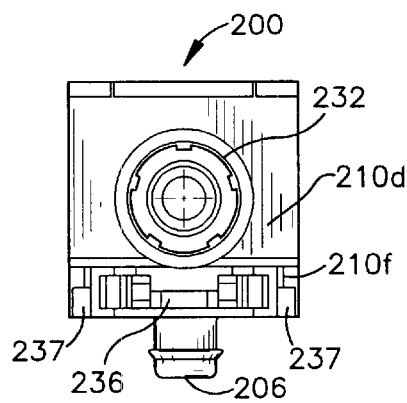
FIG. 16 is an end view of the bobbin/valve body.

The bottom walls 210c and 212c define a flat bottom surface of the bobbin/valve body 200, except for the port nipples extending perpendicular therefrom. (FIGS. 14, 15 and 16.) These bottom walls 210c and 212c also define an outer surface of the finished valve 100 (FIGS. 2 and 3) whereby the valve 100 includes a flat bottom surface. This construction makes this port-side surface of the valve 100 and the bobbin/valve body 200 suitable for flush mounting against a flush surface, such as a manifold or PC board.

The top wall 210a of the end portion 210 includes a trapezoidal (with rounded slanted sides) platform 220 and a linear platform 222 defining a linear groove 224 and a pair of semi-circular recesses 226. (FIG. 13.) The side walls 222 each include a semi-cylindrical slot 228 extending from the respective semi-circular recess 226 on the top wall 210a to a respective semi-circular recess 230 on the bottom wall 210c. (FIGS. 13 and 14.) The end wall 210d includes a centrally located opening 232 into the interior of the body 200 (FIG. 16). The other end wall 210e (not shown in detail) forms the union between the portions 210 and 214. The shelf 210e includes a pair of rectangular slots 234 extending from its top edge to its bottom edge (FIGS. 13 and 15), a window 236 extending between the slots 234 (FIG. 16), and rectangular recesses 237 formed on the top surface of its outer corners (FIGS. 13, 14 and 15).

Figure 17:
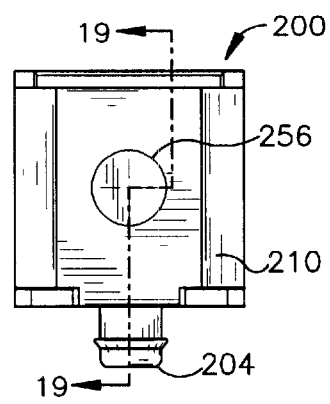
FIG. 17 is another end view of the bobbin/valve body.

The top wall 212a of the end portion 212 includes a rectangular window 238 surrounded by a C-shaped ledge 240 and a square dish 242. (FIG. 13.) The bottom wall 212b includes a trapezoidal (with rounded corners) pedestal 248 surrounding the common port 202 and a rectangular pedestal 250 surrounding the normally closed port 204 which form a linear path 252 and semi-circular recesses 254. (FIG. 15.) The side walls 212c each include a square window 244 and a semi-cylindrical slot 246. (FIG. 14.) The end wall 212d includes a circular bump 256 and the end wall 212e essentially forms a union between the portions 212 and 214. (FIG. 17.)

The exterior profile of the bobbin/valve body 200 is adapted to accommodate the different mounting arrangements of the valve 100. The semi-cylindrical slots 228 and 246 on the side walls 210b and 212c form a channel for the C-shaped mounting wire 152 when the valve 100 is mounted port-side-up on a PC board or panel as is shown in FIG. 8. The linear groove 224 on the top wall 210a and the linear groove 252 on the bottom wall 212c cradle the cross-wire 154 when the valve 100 is side mounted to a PC board as is shown in FIG. 9. When valve assemblies 100 are placed side-by-side as shown in FIG. 10, the adjacent slots 228 and 246 form cylindrical receptacles for the shafts of the screws 156 and the adjacent recesses 230 and 254 form circular rests for the screw heads. Also, adjacent shelf recesses 237 form a mounting flange for clips (not shown) used to secure the valve assemblies 100 to the board.

As is explained in more detail below, the exterior profile of the body 200 is also adapted to accommodate the manufacturing and/or assembly of the valve 100. However, it may be noted that the square dish 242 and the circular bump 256 are included to accommodate the molding process of the bobbin/valve body 200 and do not play a functional role in the finished valve 100. That being said, the square dish 242 does provide a convenient location for placement of a manufacturer's identification and/or a valve classification.

The interior of the bobbin/valve body 200 is best explained by referring to FIGS. 18–22. As shown in FIGS. 18 and 19, the portions 210, 212 and 214 include interiors walls that together define an interior longitudinal bore 260 extending from the opening 232 in the end portion 210, coaxially through the cylindrical portion 214, and into (but not through) the end portion 212. (FIGS. 18 and 19.) The bore 260 may be viewed as including a series of longitudinal sections, namely a widened section 262, an unribbed section 264, and a ribbed section 266.

The widened section 262 extends inwardly from the opening 232 in the end wall 210a of the end portion 210. The unribbed section 264 extends from the outlet section 262 through the cylindrical central portion 214 and defines a generally smooth or unribbed surface. (FIG. 20.) The ribbed section 266 extends from the unribbed section 264 to the bore's axial end and includes a series of radial ribs 268 (five in the illustrated embodiment). (FIG. 21.)

The portions 210 and 212 include other interior walls that define fluid passageways. Specifically, the end block portion 210 defines a normally open passageway 276 radially extending from the widened outlet bore section 262 to the normally open port 206. (FIG. 18.) The end block portion 212 defines a common passageway 278 extending radially between the common port 202 and the ribbed plunger section 266, a cross-over passageway 280 extending axially from the end of the plunger section 266, and a normally closed passageway 282 extending radially between the end of the cross-over passageway 280 and the normally closed port 204. (FIGS. 18 and 21.) A valve seat 284 is defined by the two-port end portion 212 at the axial end of the bore, this valve seat 284 surrounding the inlet to the cross-over passageway 280. (FIGS. 18 and 19.)

The one-port end portion 210 further defines capture receptacles for components of the solenoid 300 (namely terminal pins 306, introduced below). Specifically, interior walls within the shelf 210f define a cavity 286 extending inward from the shelf's window 236 and ledges 288 and 290 positioned within the cavity 286. (FIG. 22.) The ledges 288 are respectively positioned laterally outward from the slots 234 and the ledge 290 is positioned between the slots 234. (FIG. 20.) The end portion 210 further defines a pair of post inlet channels 292 and capture channels 294. (FIGS. 19 and 22.) The inlet channels 292 extend axially inward from the cavity 286 on either side of the normally open port 206 and the capture channels 294 extend axially inward and through openings 296 in the end wall 210e. The end wall 210e further includes grooves 298 extending laterally outward from the openings 294. (FIG. 20.)

The solenoid 300 includes a coil 302, terminal pins 304, a flux conductor 306, and a pole piece 308. The terminal pins 304 are illustrated in detail in FIG. 23 as they are being assembled to the bobbin/valve body 200. As shown, each of the pins 304 includes a post section 310, a stepped section 312, a ridged section 314 and a contact section 316. In the stage of assembly shown, the top post sections 310 extend outwardly from the window 286 of the body 200 prior to be bent into the desired orientation. The stepped sections 312 rest between the ledges 288 and 290 and extends into the inlet channels 292. The ridged sections 314 are captured within the channels 294 and the contact sections 316 extend through the openings 296 in the end wall 210e.

The contact sections 316 are perpendicularly bent into the grooves 298 to secure the terminal pins 304 to the bobbin/valve body 200 and to place the sections 316 in a contacting position with the solenoid coil 302. (FIG. 3.) The post sections 310 may be perpendicularly bent into an upstanding orientation such as is shown in FIGS. 1–3. Alternatively, the post sections 310 may be trimmed and/or otherwise bent to accommodate particular mounting arrangements. To this end, the post sections 310 preferably include a neck 318 (See FIG. 3) which may be used during this bending and breaking.

Once the terminal pins 304 have been fully assembled in the desired manner relative to the bobbin/valve body 200, it may be noted that windows or openings are created within the slots 234. Electrical posts (not shown) may be inserted through these openings to be in electrical contact with the terminal pins 304. This type of arrangement would be very advantageous for a "ports-down" a PC board mounting arrangement wherein the electrical posts could double both as the mounting components and as part of the electrical circuitry.

The flux conductor 306 is illustrated in detail in FIGS. 24–28 and, as shown, has a single piece or unitary construction with a roughly sideways C-shape. (FIG. 26.) The conductor 306 comprises a top section 320, an end section 322, and another end section 324. (FIGS. 24, 25 and 26.) The top section 320 is approximately rectangular in shape except for concavely curved corners 326 and stepped corners 328. (FIG. 25.) The end section 322 is in the shape of a bridge having a substantially semicircular opening 330 and steps or ridges 332 on its outer side surface. (FIGS. 24, 26 and 27.) The end section 324 is also in the shape of a bridge having a substantially semicircular opening 334. (FIG. 28.)

Figure 29:
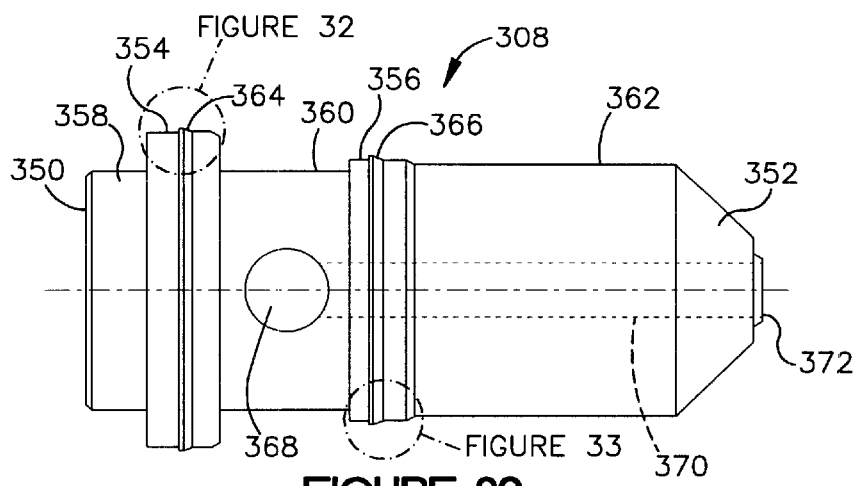
FIG. 29 is a side view of another component of the valve's solenoid, namely a pole piece.
Figure 30:
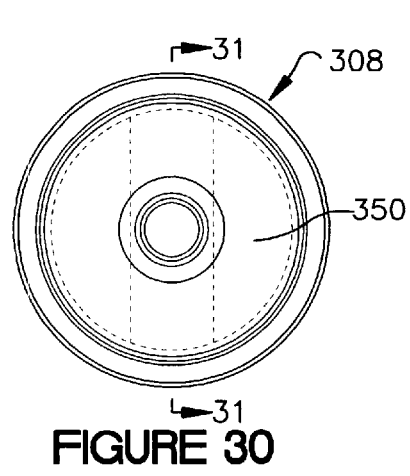
FIG. 30 is an end view of the pole piece.
Figure 32:
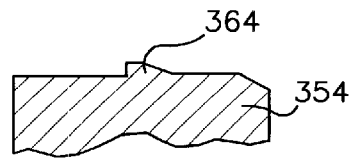
FIG. 32 is a enlarged portion of the sectional view of FIG. 31.
Figure 33:
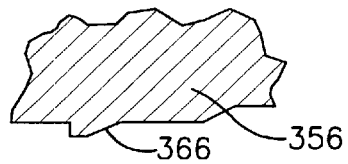
FIG. 33 is another enlarged portion of the sectional view of FIG. 31.
Figure 31:
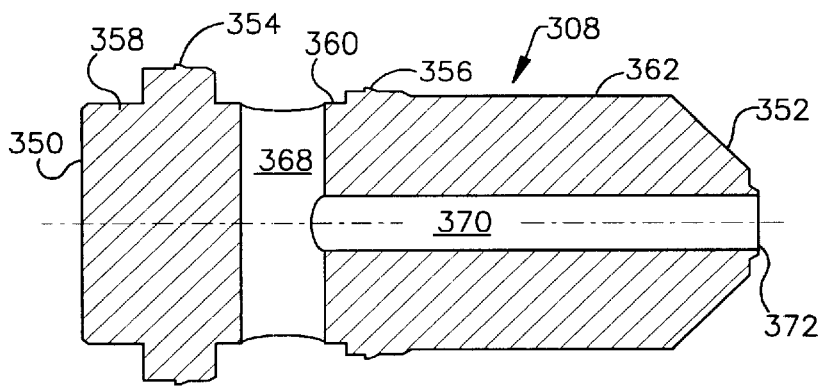
FIG. 31 is a sectional view of the pole piece as taken along lines 3131 in FIG. 30.

The pole piece 308 is illustrated in detail in FIGS. 29–33 and, as shown, comprises a generally cylindrical member having axial ends 350 and 352. (FIGS. 29–31) The axial end 350 has flat profile and the other axial end 352 has a conical profile. (FIGS. 29 and 31.) The pole piece 308 includes two annular flanges 354 and 356 which may be viewed as forming longitudinal surface sections 358, 360 and 362. The annular flange 354 includes an inclined annular tab 364 and the annular flange 356 includes an annular tab 366. (FIGS. 31–33.) A radial passageway 368 extends transversely through the longitudinal section 358 and a longitudinal passageway 370 extends axially from the center of the passageway 368 to the pole's axial end 352. (FIGS. 29 and 31.) A valve seat 372 is formed about the end of the passageway 370 on the end 352. (FIG. 29.).

Figure 34:
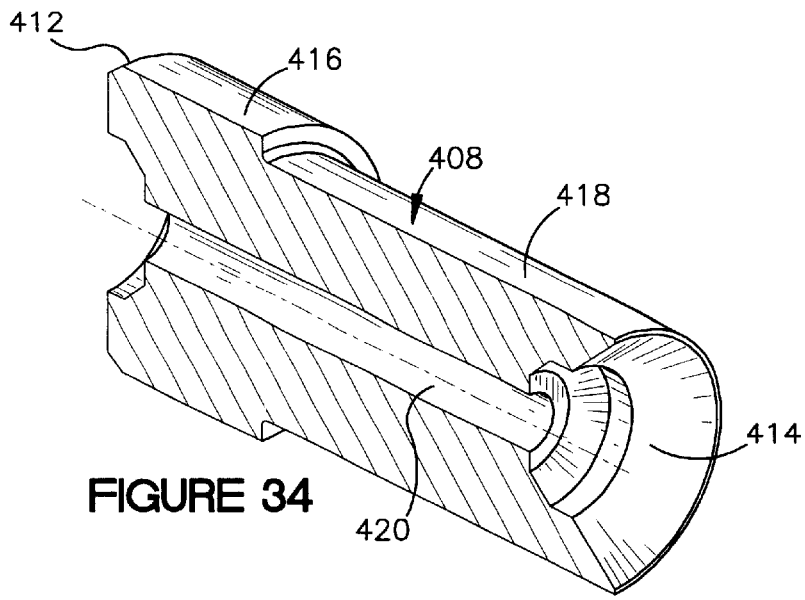
FIG. 34 is perspective cross-sectional view of a component of the plunger, namely a plunger body without its elastomeric core.

The plunger 400 includes a plunger body 402, a spring retainer 404 and a biasing spring 406. The plunger body 402 is illustrated in detail in FIGS. 34 and 35 and, as shown, comprises a generally cylindrical member 408 and an elastomeric core 410. The cylindrical member 408 has axial ends 412 and 414 and a stepped outer surface forming longitudinal sections 416 and 418. (FIG. 34.) The axial end 412 has a flat contour and the axial end 414 has an inwardly funneled contour. The member 408 includes a hollow roughly barbell-shaped core 420 extending between its axial ends 412 and 414.

Figure 35:
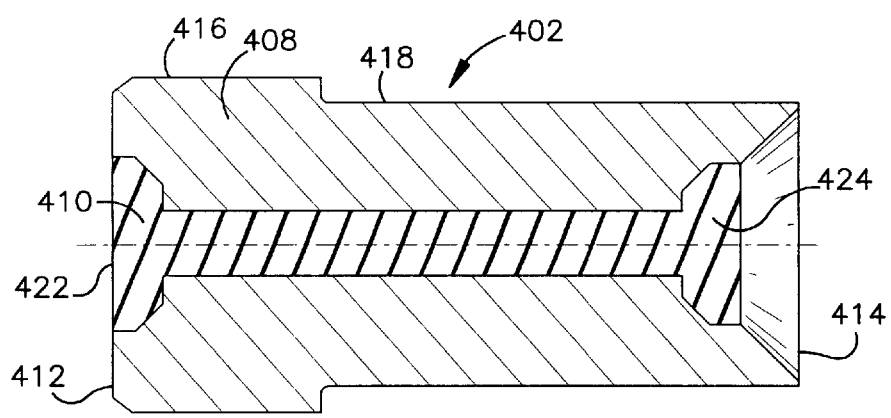
FIG. 35 is a cross-sectional view of the plunger body with its elastomeric core.

The profile of the hollow core 420 adjacent the end 412 is a stepped profile and the profile of the core 416 adjacent the end 414 is a half-octagonal profile, in section. (FIG. 34.) The elastomeric core 410 is positioned within the core 420 of the cylindrical member 408 and thus has a complimentary contour. Specifically, one axial end 422 has a stepped profile and the other axial end 424 has a half-octagonal profile, in section. (FIG. 35.) It may be noted that the illustrated overall barbell-shape of the elastomeric core 410, and/or the shape of its axial ends 422 and 424, are preferred for the purposes of manufacturing. From a functional point of view, any sealing suitable surface (such as rubber disks) on the axial ends of the plunger body 408 would be sufficient.

Figure 36:
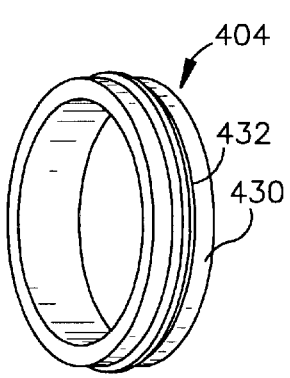
FIG. 36 is a perspective side view of another component of the plunger device, namely a spring retainer.
Figure 37:
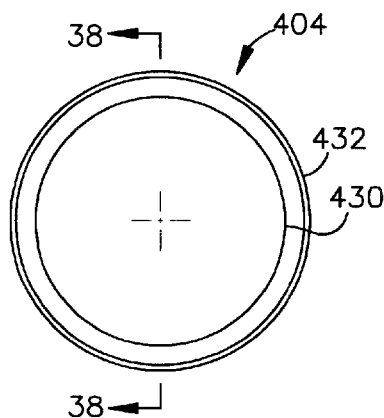
FIG. 37 is an end view of the spring retainer.
Figure 38:
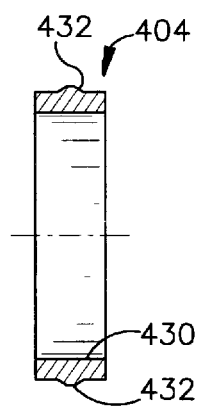
FIG. 38 is a cross-sectional view of the spring retainer as taken along lines 38—38 in FIG. 37.

The spring retainer 404 is illustrated in detail in FIGS. 36–38 and, as shown, comprises a ring-shaped member 430 having a beaded rib 432 projecting radially from its outer surface.

Cross-sectional views of the assembled valve 100 in a deenergized state are shown in FIGS. 39–42. In the assembled valve 100, the coil 302 is wound around the central cylindrical portion 214 of the bobbin/valve body 200 within the annular cavity 216. (FIGS. 39 and 40, cavity 216 shown and numbered in FIGS. 13–15.) The terminal pins 304 extend perpendicularly upward from the shelf 210f and their contact sections 316 are in electrical contact with the ends of the solenoid coil 302. (FIG. 39, contact sections 316 shown and numbered in FIG. 23.)

The flux conductor 306 straddles the central cylindrical portion 214 and the end portion 210 of the bobbin/valve body 200 thereby straddling sections of the bobbin/valve body 200 containing the common port 202 and the normally open port 206. Specifically, the flux conductor's end section 320 is positioned within the cavity connecting the top rectangular window 238 and the side square windows 244 of the end block section 210 and its bridge opening 330 is swage-coupled onto walls within the cavity defining the body's longitudinal bore 260. (FIG. 39, cavity shown in FIG. 12, windows shown/numbered in FIGS. 13 and 14, bridge opening shown and numbered in FIG. 27.) The flux conductor's top section 322 extends over the top of the coil 302 and over the top wall of the end block portion 210. (FIGS. 39–42.) The flux conductor's end section 322 extends over the end wall of the block portion 210 and its bridge opening 334 is swage-coupled to the axial end 350 of the pole piece 308. (FIG. 39, bridge opening shown and numbered in FIG. 28.)

Figure 39:
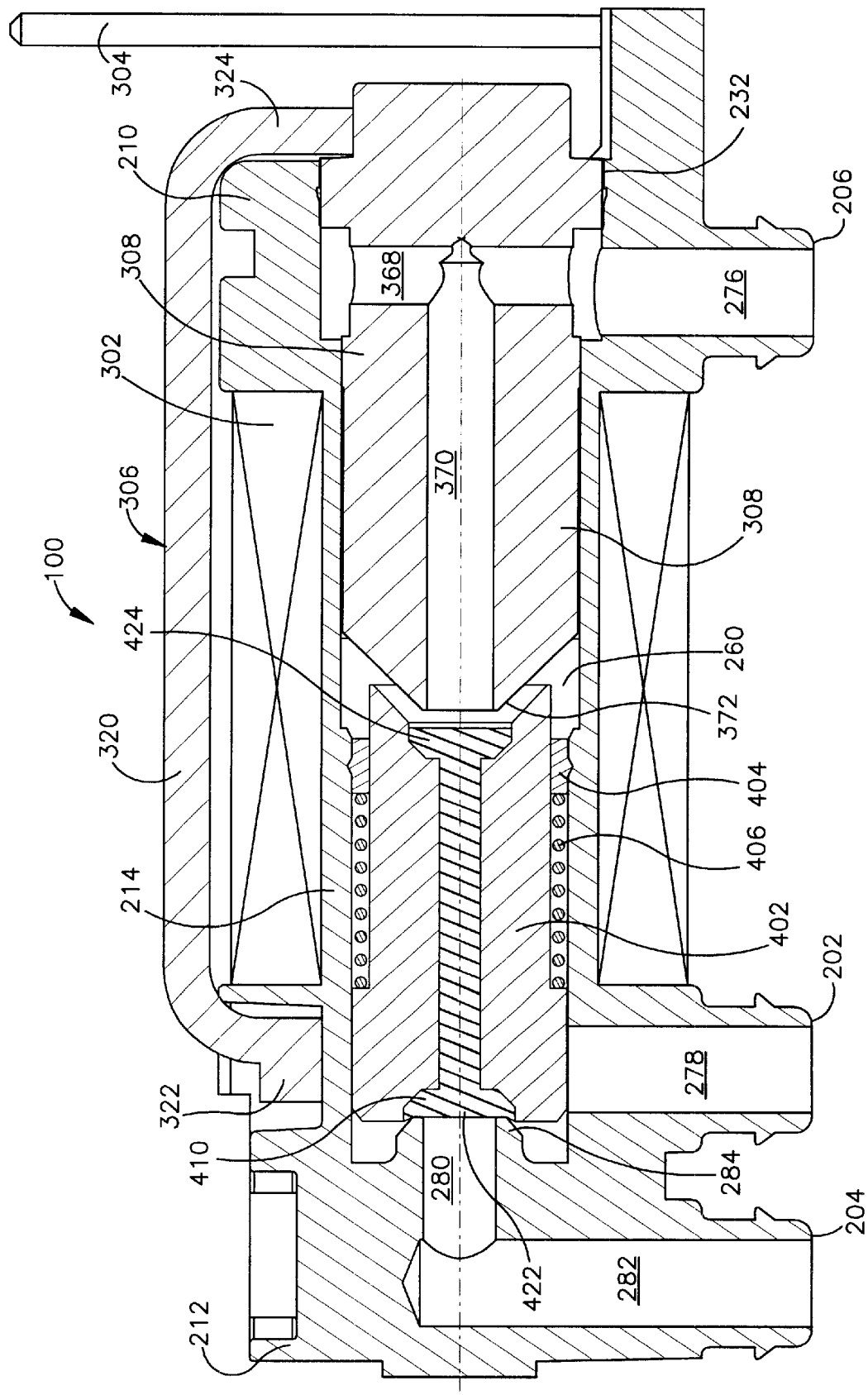
FIG. 39 is an axial cross-sectional view of the valve in a deenergized state.

The pole piece 308 is positioned within the longitudinal bore 260 of the bobbin/valve body 200. (FIG. 39.) The pole's axial end 350 and its longitudinal section 358 extends through the opening 232 in the end wall of the block end portion 210. (FIG. 39, pole end and section shown/ numbered in FIGS. 29–31, block end opening shown/ numbered in FIG. 16.) The annular flange 354 and the longitudinal section 360 are positioned within the bore's widened outlet section 262, with the radial passageway 368 communicated with the normally open passageway 276. (FIG. 39, pole's flange and sections shown/numbered in FIGS. 29 and 31.) The widened section 262 of the bore 260 and the flanges 354 and 356 form an annular passageway between the pole's radial passageway 268 and the normally open passageway 276. (FIG. 39, bore section numbered in FIGS. 18 and 19, pole flanges 354 and 356 numbered in FIGS. 29 and 31.)

The pole's annular flange 356, its longitudinal section 362 and its axial end 352 are positioned within the bore's unribbed section 364. (FIG. 39, pole's flange, section and end shown/numbered in FIGS. 29 and 31.) The pole's annular tabs 364 and 366 mate with interior walls defining the bore 260 of the bobbin/valve body 200 in press-fit fashion. (FIGS. 43 and 44.) The sealing between the bobbin/ valve body 200 and the pole's flanges 354 and 356 and its longitudinal section 362 is such that fluid is prevented from leaking around the pole piece 308. In this manner, a fluid-tight seal is created between the bobbin/valve body 200 and the pole piece 308 without the need for additional coupling elements, such as welds, adhesives, sealing rings, etc.

The plunger body 402 is positioned within the longitudinal bore 260 of the bobbin/valve body 200. (FIGS. 39–42.) More particularly, the plunger body 402 is positioned primarily within the bore's ribbed section 266 with its funneled axial end 414 positioned within the unribbed section 264. (FIGS. 39–42, bore's sections numbered in FIGS. 18 and 19, plunger's axial end numbered in FIGS. 29 and 31.) In the illustrated deenergized state of the valve 100, the spring 406 biases the plunger's flat axial end 350 is positioned adjacent the valve seat 284 with the axial end 424 of the elastomeric core 410 being seated there against. (FIG. 39.) The plunger's funneled axial end 414 is positioned in a complimentary but spaced arrangement with the pole's conical axial end 352. (FIG. 39, plunger's axial end numbered in FIGS. 34 and 35, pole's axial end numbered in FIGS. 29 and 31.)

The plunger's widened section 408 is movably positioned within the ribs 268 of the bobbin/valve body's bore 260. (FIGS. 41 and 42, plunger section numbered in FIGS. 34 and 35, ribs 268 also numbered in FIGS. 18 and 19.) The spring retainer 404 is fixedly (but adjustably) positioned at the end of the ribbed section 266 and the retainer's beaded rib tab 432 is mated with the groove in the bore in a press-fit fashion. (FIG. 41, ribbed section numbered in FIGS. 18 and 19, retainer tab numbered in FIGS. 36–38.) The spring 406 is a cylindrical spring coiling around the plunger body 402 and more particularly within an annular chamber defined by the ribs 268, the plunger's widened section 408, and the spring retainer 404. (FIGS. 39, 41 and 42, ribs numbered in FIGS. 18 and 19, plunger section numbered in FIGS. 29–31.) This wrapped arrangement of the spring 406 relative to the plunger body 402 contributes to a reduction in overall axial length of the valve 100 when compared to, for example, a valve design wherein a spring is positioned axially adjacent a plunger body.

In the illustrated deenergized state of the valve assembly 100, the spring 406 biases the plunger body 402 towards the cross-over passageway 280 so that, as was indicated above, the axial end 422 of the elastomeric core 410 is seated against the valve seat 284. (FIG. 39.) This seating seals the cross-over passageway 280 and thus the normally closed passageway 282. During operation of the valve 100 in the deenergized state, fluid flows through the common port/ passageway 202/278 and through the annular flow passages between the ribs 268 towards the pole piece 308. It may be noted that, although the ribs 268 are integral with the bobbin/valve body 200 in the illustrated embodiment, similar annular flow passages could instead be created by a ribbed or fluted plunger body 402.

Because of the spaced arrangement between the pole piece 308 and the plunger body 402, the fluid then flows into the funneled opening in the plunger body 402, through the pole piece's longitudinal passageway 370 to the pole piece's radial passageway 368, through the annular passageway (defined by the bore's widened section 262 and the pole piece's flanges 354 and 356) and out through the normally open passageway/port 276/206.

To energize the valve 100, electrical current is applied to the terminals to generate a magnetic field in the coil 302. The flux conductor 306 concentrates the magnetic field in a desired manner and the field is transmitted to the pole piece 308. The magnetic force of the pole piece 308 overcomes the biasing force of the spring 406 and the plunger body 402 is moved towards the pole piece 308. This movement of the plunger body 402 results in the axial end 422 of the elastomeric core 410 being moved away from the valve seat 284 and the insert's axial end 424 being seated against the pole piece's valve seat 372. In this manner, the longitudinal passageway 370 of the pole piece 308 is sealed thereby blocking the flow passageways to the normally open passageway/port 276/206. During operation of the valve 100 in the energized state, fluid flows through the common port/passageway 202/278 and through the annular flow passages between the ribs 268 towards the pole piece 308, but is blocked from entering the pole piece 308. Fluid instead flows through now unblocked cross-over passageway 280 to the normally closed passageway/port 282/204.

To assemble the valve 100, the plunger body 402 is first inserted into the longitudinal bore 260 of the bobbin/valve body 200 through the end opening 232 in the end block portion 210. The spring 406 may be positioned around the plunger body 402 during this insertion or later inserted into the bore 260 and around the plunger body 402. The spring retainer 404 is then inserted into the bore 260 and into a fixed position by the press-fit mating of its bead 432 with the flow ribs.

It may be noted that the biasing force placed on the plunger body 402 may be selectively adjusted by varying the depth of the retainer 404 relative to the bobbin/valve body 200. Alternatively, the axial length of the spring retainer 404 may be varied to adjust the biasing force. Another option contemplated by the present invention is a spring retainer that is permanently fixed to the bobbin/valve body 200. Moreover, a "retainerless" design may instead be used wherein the spring 406 is captured within pockets in the plunger body 402. It may be noted, however, that the latter two options may limit spring adjustability options.

The pole piece 308 is next inserted through the end opening 232 into the longitudinal bore 260 and press-fit into position by the press-fit mating of the barbed ribs 354 and 356. (FIGS. 43 and 44.) Significantly, this assembly of the pole piece 308 requires no additional coupling components thereby simplifying manufacturing techniques and/or reducing cost considerations.

Before or after the insertion of the pole piece 308 and the plunger components 402, 404 and 406, the coil 302 is wound about the central cylindrical section 214 of the bobbin/valve body 200 and the terminal pins 306 are secured to the body 200 in the manner described above during the discussion of FIG. 23. As was explained above, the bobbin/valve body 200 is compatible with a variety of different terminal arrangements thereby decreasing manufacturing efforts and/or expenses by way of reduced inventory requirements.

After the coil 302 has been assembled, the flux conductor 304 is coupled to the bobbin/valve body 200. Specifically, the conductor's end section 320 is inserted through the top rectangular window 238 and into the cavity between this window and the side square windows 244. The bridge opening 330 fits over the curved interior walls of the end block portion 212 defining the body's longitudinal bore 260 and a suitable swage tool may be inserted through the side windows 244 to interact with the ridges 322 to lock the conductor 304 in position. (FIG. 39, cavity shown in FIG. 12, windows shown and numbered in FIGS. 13 and 14, bridge opening shown/numbered in FIG. 27.) The flux conductor's other end section 322, and particularly its bridge opening 334 is swaged over the pole piece's axial end 350 thereby coupling the flux conductor 304 to the bobbin/valve body 200. (FIG. 39, bridge opening shown/number in FIG. 28.) It may noted that the preferred one piece construction of the flux conductor 304 makes it suitable for extremely economic manufacturing techniques, such as stamping. Moreover, by swage-coupling of the flux conductor 304 to the bobbin/valve body 200 and/or the pole piece 350 allows assembly without the need for additional coupling steps or components, such as welding.

One may now appreciate that the valve 100 that may be manufactured and/or assembled in a relatively simplified manner, within reasonable economic ranges, and with a minimization of leakage issues. Moreover, the valve 100 may be used for a wide variety of industrial, medical and/or analytical systems and does not require different valve constructions to accommodate these different mounting arrangements. While the valve 100 may be produced in a very compact size, it has many features that would be equally advantageous in large valve sizes. Although the invention has been shown and described with respect to a certain preferred embodiment, it is obvious that equivalent and obvious alterations and modifications will occur to others skilled in the art upon the reading and understanding of this specification.

What is claimed is:

1. A valve comprising:

a one-piece bobbin/valve body defining a common port, a normally closed port, a normally open port, a longitudinal bore, respective passageways between the longitudinal bore and the three ports, and a central section between two of the three ports;

a solenoid which is selectively energizable to produce a magnetic field;

a plunger including a plunger body which moves within the bore in response to energization/deenergization of the solenoid between a first position whereat the passageway to the normally closed port is sealed from the longitudinal bore and the passageway to the normally open port communicates with the longitudinal bore and a second position whereat the passageway to the normally closed port communicates with the longitudinal bore and the passageway to the normally open port is sealed from the longitudinal bore;

wherein the bobbin/valve body defines a chamber around the central section and wherein the solenoid includes a coil positioned within the chamber.

2. A valve as set forth in claim 1, wherein the central section of the bobbin/valve body is an elongated section.

3. A valve comprising a bobbin/valve body, a solenoid, and a plunger;

the bobbin/valve body defining a plurality of ports, a longitudinal bore, and respective passageways between the longitudinal bore and the ports;

the plurality of ports including a first port and a second port which both extend radially outward from the longitudinal bore in the same direction;

the bobbin/valve body having a central section positioned between the first port and the second port and at least partially defining the longitudinal bore;

the plunger including a plunger body which moves within the bore in response to energization/deenergization of the solenoid to convert the valve between an open state and a closed state;

the solenoid including a pole piece positioned within the longitudinal bore and a solenoid coil wound around the central section of the bobbin/valve body; and the solenoid coil surrounding both the plunger body and the pole piece for a majority of their axial length.

4. A valve as set forth in claim 3, wherein the bobbin/valve body is formed in one piece.

5. A valve as set forth in claim 4, wherein the central section of the bobbin/valve body is an elongated section.

6. A valve as set forth in claim 3, wherein the central section of the bobbin/valve body is an elongated section.

7. A valve having a common port, a normally closed port, a normally open port, a longitudinal bore, and respective passageways between the longitudinal bore and the three ports, comprising:

a bobbin/valve body formed in one piece and defining the normally open port, at least a portion of the longitudinal bore, a central section between the normally open port and one of the other two ports, and a chamber around the central section;

a solenoid which is selectively energizable to produce a magnetic field and which includes a coil positioned within the chamber;

a plunger including a plunger body which moves within the bore in response to energization/deenergization of the solenoid between a first position whereat the passageway to the normally closed port is sealed from the longitudinal bore and the passageway to the normally open port communicates with the longitudinal bore and a second position whereat the passageway to the normally closed port communicates with the longitudinal bore and the passageway to the normally open port is sealed from the longitudinal bore.

8. A valve as set forth in claim 7, wherein the central section of the bobbin/valve body is an elongated section.

9. A valve comprising:
   a bobbin/valve body formed in one piece and defining a common port, a normally closed port, a normally open port, a longitudinal bore, and respective passageways between the longitudinal bore and the three ports;
   a solenoid which is selectively energizable to produce a magnetic field;
   a plunger including a plunger body which moves within the bore in response to energization/deenergization of the solenoid between a first position whereat the passageway to the normally closed port is sealed from the longitudinal bore and the passageway to the normally open port communicates with the longitudinal bore and a second position whereat the passageway to the normally closed port communicates with the longitudinal bore and the passageway to the normally open port is sealed from the longitudinal bore;
   wherein the bobbin/valve body defines a chamber and wherein the solenoid includes a coil positioned within the chamber;
   wherein the bobbin/valve body includes an end portion defining the normally open port, an end portion defining the common port and the normally closed port, and a central portion therebetween;
   wherein bottom walls of these end portions define a mounting surface of the valve which is flat except for port nipples extending perpendicularly therefrom; and
   wherein the chamber is located around the central portion.

10. A valve as set forth in claim 9, wherein the central portion of the bobbin/valve body is an elongated section.

11. A valve comprising a bobbin/valve body, a solenoid, and a plunger; wherein:
   the bobbin/valve body is formed in one piece and defines a plurality of ports, a longitudinal bore, and respective passageways between the longitudinal bore and the ports;
   the plurality of ports including a first port and a second port which both extend radially outward from the longitudinal bore in the same direction;
   the bobbin/valve body having a central section positioned between the first port and the second port and at least partially defining the longitudinal bore;
   the solenoid being selectively energizable to produce a magnetic field and including a coil wrapped around the central section of the bobbin/valve body;
   the plunger includes a plunger body which moves within the bore in response to energization/deenergization of the solenoid between a first position whereat the passageway to the first port is sealed from the longitudinal bore and a second position whereat the passageway to the first port communicates with the longitudinal bore.

12. A valve as set forth in claim 11, wherein the central section of the bobbin/valve body is an elongated section.

13. A method of making a valve comprising the steps of:
   forming a bobbin/valve body including ports, a longitudinal bore, and passageways between the longitudinal bore and the ports;
   inserting a plunger body through an end opening in the bobbin/valve body into the longitudinal bore;
   inserting a pole piece through the end opening in the bobbin/valve body into the longitudinal bore;
   press-fit coupling the pole piece to the bobbin/valve body;
   attaching electrical contacts to the bobbin/valve body;
   winding a solenoid coil around a central section of the bobbin/valve body; and
   attaching a flux conductor to the bobbin/valve body and the pole piece;
   wherein said forming step comprises forming the bobbin/valve body so that the central section is positioned between a first of the plurality of ports and a second of the plurality of ports.

14. A method as set forth in claim 13, wherein said forming step comprises forming the bobbin/valve body in one piece.

15. A method as set forth in claim 14, wherein said forming step comprises forming the central section of the bobbin/valve body as an elongated section.

16. A method as set forth in claim 13, wherein said forming step comprises forming the central section of the bobbin/valve body as an elongated section.

* * * * *